Patented Apr. 1, 1947

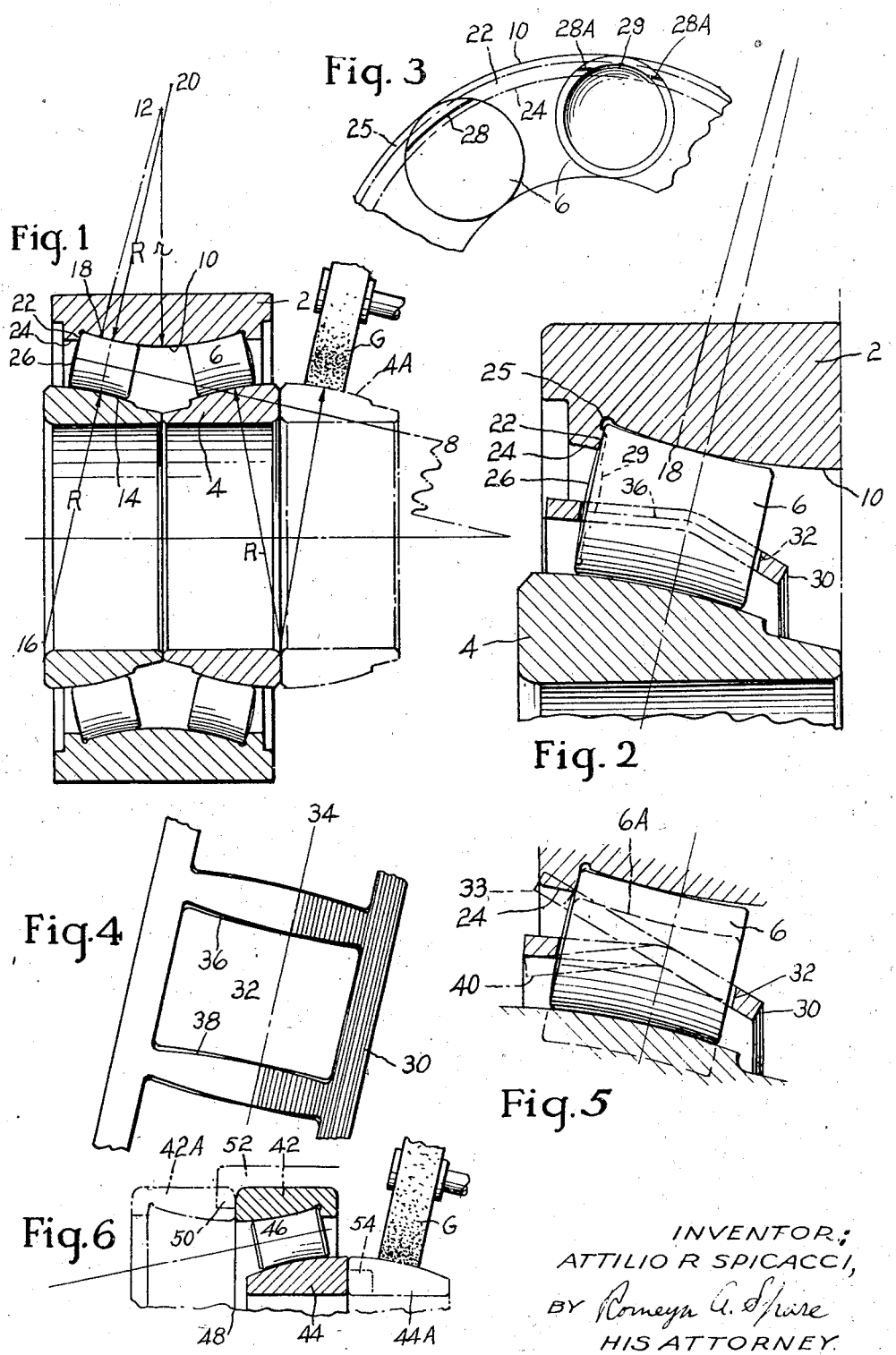

2,418,322

UNITED STATES PATENT OFFICE 2,418,322

ROLLER BEARING

Attilio R. Spicacci, Bristol, Conn., assignor to General Motors Corporation, Detroit, Mich., a corporation of Delaware Application March 16, 1944, Serial No. 526,719

11 Claims. (Cl. 308—213)

This invention relates to roller bearings and comprises all of the features and aspects of novelty herein disclosed. An object of the invention is to provide a simple and effective precision roller bearing structure which can be manufactured at low cost. Another object is to provide an improved method of manufacturing a double row roller bearing so that the raceways will be accurately matched and interchangeable. Another object of the invention is to provide an improved separator which is capable of economical production and is especially adapted for spacing rollers of the concave or waisted type.

To these ends and also to improve generally upon devices of this character, the invention consists in the various matters hereinafter described and claimed. In its broader aspects the invention is not necessarily limited to the specific construction selected for illustrative purposes in the accompanying drawings in which Fig. 1 is an axial sectional view of the bearing, the separators being omitted.

Fig. 2 is an enlarged section of a portion of the bearing.

Fig. 3 is a diagram.

Fig. 4 is a view of a portion of the separator of Fig. 2.

Fig. 5 is a sectional view of a portion of the bearing illustrating the method of assembly.

Fig. 6 is a sectional view of a single row bearing.

The bearing comprises an outer race ring 2, a pair of abutting inner race rings 4 and two rows of rollers 6 of the waisted or hour glass type which may be symmetrical or truncated, the axes 8 of the rollers converging towards the bearing axis as they approach each other. The outer raceways for the two sets of rollers are formed on one continuous curved surface 10 of revolution generated by a circular arc revolved about the axis of the bearing, the center of the arc whose radius is $r$ being at a point 12 in the center line of the bearing so that the generated surface is symmetrical with respect to that center line.

The raceway 14 of each inner race ring is generated by a circular arc revolved about the bearing axis, the center of the arc whose radius is R being at some point 16 in the plane of the finished outer end face of the race ring. This construction enables the two inner raceways to be ground or otherwise generated at a single setup, as by oscillating the race rings relatively to a grinding wheel G while clamped together in reversed abutting relation as indicated by the broken line showing of the race ring 4A in Fig. 1.

The radius of the profile or longitudinal curvature of the roller surface is preferably the same as the radius R of the inner raceway with the center at the same point 16 so that the roller and the inner raceway have a theoretical line of contact. The radius of the roller profile could be somewhat longer than the radius R but it would not be desirable to have it shorter. The radius $r$ of the outer raceway is purposely made substantially shorter than the radius R so that there is a theoretical point of contact as at 18 with the roller profile whose center of curvature of radius R would come at some point 20 at one side of the center line and on a line from point 16 perpendicular to the roller axis. The smallest or waist diameter of the roller would necessarily lie on the line 16—20 between the points of the arrows whether the roller is symmetrical about that line or somewhat truncated as shown. Having located the points 16, 20 and the tangent point 18, the radius $r$ fixes the position of the point 12 and hence line 12—18 determines the angle of contact at the outer raceway. Fig. 2 shows the relative curvatures in somewhat exaggerated degree.

Since the tangent point 18 is made to come at one side of the waist diameter of the roller, there is a thrust load component tending to push the roller axially towards its larger end and the load reaction is taken by a conical thrust surface 22 on a shoulder 24 which projects inwardly from the outer race ring. Between the thrust surface 22 and the raceway 10 is a relief groove 25. The outer end face 26 of each roller is preferably formed as a segment of a sphere of large radius, the center of the spherical surface being at a distant point where the axes 8 of all the rollers intersect the bearing axes. Thus the segmental spherical end face of each roller, first assuming it is not recessed, will have a single arcuate line of contact 28 with the conical shoulder as indicated by the left hand roller in Fig. 3. Ordinarily the ends of the rollers would be centrally recessed as a result of heading during manufacture as indicated by the circular recess 29 in Figs. 2 and 3. This is taken advantage of to procure two separated arcs of contact 28A as shown by the right hand roller in Fig. 3. Hence the roller will be reliably guided and kept from skewing. These arcuate lines are preferably located about half way between the terminal edge of the shoulder 24 and the relief groove 25 and lie on a circle where the conical face 22 is made tangent to the sphere. Thus the thrust load component tending to push the roller endwise against the arcuate lines of contact 28A is resisted by an opposite force directed towards the center of the sphere.

The rollers in each row are spaced by a separator 30 which is simplified by taking advantage of certain peculiar characteristics of the roller profile. The peripheral surface of each roller substantially coincides with that portion of a hyperboloid of revolution lying near the vertex. A hyperboloid of revolution can be generated by revolving a straight line around an axis, the line being skewed out of parallelism with such axis. When making the separator, a conical ring is first punched with a series of rectangular openings 32 appreciably longer than the rollers. One side of this conical ring whose initial position is indicated in Fig. 5 by the broken lines 33 is then bent inwardly at a plane 34 corresponding to the waist diameter of the truncated rollers. Both sides of the separator make the same angle with the roller axis and that angle is selected so that the front and rear edges 36 and 38 of the separator pockets have line contact with the adjacent straight line elements in the hyperboloid of the roller surface. To make these edges conform to the circumferential curvature of the rollers and thus provide areas of contact, they may be swaged to concave shape as by a roller which is slightly oversize.

For purposes of assembly the higher side of the separator is temporarily bent inwardly as indicated at 40 in Fig. 5 a few degrees beyond its final position. This is for the purpose of allowing the caged rollers 6 to pass inside of the thrust shoulder 24. The rollers are assembled in the roller openings from the outside, each in a position indicated by the broken line 6A, and this unit is moved axially inside the outer race ring before the inner race ring is slid within the circle of rollers. The high side of the separator is then expanded to its final position by suitable apparatus whereupon the inner race ring is slid in axially.

The bearing herein illustrated is a double row bearing but one half of it has the necessary elements desirable for an efficient single row bearing. In the case of the double row bearing, the two inner raceways are ground at one setup and so are the outer raceways and hence the raceways are matched up perfectly and economically. In the case of single row bearings, there is a similar economy in manufacture since two outer race rings of two separate bearings (or two inner race rings of separate bearings) can be clamped together and ground as one, the center of the curve in each case being in the plane of the end face of the race ring. Fig. 6 shows such a single row bearing having an outer race ring 42, an inner race ring 44, and waisted rollers 46 which in this instance are symmetrical and provided with chamfered ends. The broken lines show outer and inner race rings 42A and 44A, respectively, of a second single row bearing and indicate how the corresponding race rings may be abutted together and their raceways generated in duplicate, the center of curvature of the two outer raceways being in a common plane 48 where the thick finished ends of the race rings abut and the center of curvature of the inner race rings being in the common plane where the thick ends of those race rings abut. These abutting thick ends of the rings are previously ground flat and are the very same faces which ultimately take thrust and locate the bearing rings in use, the outer race ring 42, for instance, engaging a thrust shoulder 50 in a housing 52 and the inner race ring 44, for instance, engaging a collar or flange 54 on a shaft. The thicker ends of the rings are the only ends that need to be nicely finished and they serve not only to accurately locate the abutting rings while the raceways are ground but also to accurately locate the completed bearing with respect to its mounting in use. As in Figs. 1 and 2, the rollers preferably have substantially line contact with the inner raceway and a point contact with the outer raceway, there being similar differences in the angles of contact so that the rollers are urged against the thrust shoulder. In some instances, it may be desirable to grind two raceways while their race rings are separated by a spacer, the center of curvature of the two races then being at a common point midway between the rings.

I claim:

1. In a double row roller bearing, two rows of longitudinally concave rollers, a race ring having a single longitudinal convex surface forming raceways for both rows of rollers, said surface being generated by a circular arc revolved about the bearing axis, the center of the arc being outside of the bearing, and a pair of like abutting race rings opposed to the first mentioned race ring and each having a longitudinally convex raceway with its center of curvature in the plane of an end face of the ring.

2. In a double row roller bearing, two rows of longitudinally profiled rollers whose axes are inclined inwardly towards each other as they approach the bearing axis, an outer race ring having a single longitudinally profiled surface forming non-spherical raceways for both rows of rollers, said surface being generated by a circular arc revolved about the bearing axis, the center of the arc being outside of the bearing, and a pair of matched and interchangeable inner race rings, the inner race rings having longitudinally profiled raceways which when the race rings are reversed end for end and placed in axial alignment have their centers at the same point.

3. In a double row roller bearing, two rows of waisted rollers whose axes are inclined inwardly towards each other as they approach the bearing axis, an outer race ring having a single longitudinally convex surface forming a pair of raceways for the two rows of rollers, said surface being generated by a circular arc revolved about the bearing axis, a pair of matched and interchangeable inner race rings abutting against one another and having longitudinally convex raceways, the rollers in the two rows being larger at their more remote ends, and one pair of raceways terminating in thrust shoulders engaging said larger ends of the rollers.

4. In a double row roller bearing, two rows of waisted rollers whose axes are inclined inwardly towards each other as they approach the bearing axis, an outer race ring having a single longitudinally convex surface forming spaced raceways for the two rows of rollers, said surface being generated by a circular arc revolved about the bearing axis, the center of the arc being outside of the bearing, and a pair of matched and interchangeable inner race rings each having a longitudinally convex raceway, the radius of curvature of each inner raceway being larger than the radius of curvature of the outer raceway.

5. In a double row roller bearing, two rows of oppositely inclined rollers having longitudinally curved surfaces in their profiles, inner and outer non-spherical raceways in matched pairs, each inner pair and each outer pair of raceways forming matched and mergible segments of a single surface of revolution, one pair of raceways being formed on two separate interchangeable race rings with each of said raceways having the center of curvature of the generating arc in the plane of the end face of the ring.

6. In a roller bearing, inner and outer race rings having raceways of longitudinally convex profile, rollers of waisted profile engaging the raceways, one end of each roller having a surface formed as the segment of a sphere whose center is in the bearing axis, and one of the race rings having a thrust shoulder with a conical surface engaging the spherical segment of each roller along an arcuate line of contact.

7. In a roller bearing, inner and outer race rings having raceways of longitudinally curved profile, rollers of longitudinally curved profile engaging the raceways, the angles of contact of the rollers at the two raceways being different to urge the rollers endwise, one end of each roller being centrally recessed with the surrounding surface formed as the segment of a sphere whose center is in the bearing axis, and one of the race rings having a thrust shoulder with a conical surface engaging the spherical segment of each roller along two arcuate lines of contact.

8. In a roller bearing, inner and outer race rings each having a non-spherical raceway of longitudinally convex profile, rollers of waisted profile engaging the raceways and having their axes inclined to the bearing axis, the rollers having line contact with one raceway and point contact with the other raceway, the angle of contact at the outer raceway being different from the angle of contact at the inner raceway to create an endwise thrust on the rollers, and one race ring having near one end a projecting thrust shoulder engaging the adjacent ends of the rollers.

9. In a roller bearing, inner and outer race rings having curved raceways, rollers of waisted profile engaging the raceways and each having its peripheral surface formed substantially in the surface of a hyperboloid of revolution, a separator ring for spacing the rollers, the separator ring having roller engaging edges extending from the waist diameter of each roller along straight line elements in the roller surface.

10. In a roller bearing, inner and outer race rings having curved raceways, rollers of waisted profile engaging the raceways and each having its peripheral surface formed substantially in the surface of a hyperboloid of revolution, a separator ring for spacing the rollers and comprising two side portions meeting at an angle at the waist diameter of the rollers, and each side portion having roller engaging edges extending along straight line elements in the hyperboloidal roller surface.

11. In a roller bearing, inner and outer race rings having curved raceways, rollers of waisted profile engaging the raceways and each having its peripheral surface formed substantially in the surface of a hyperboloid of revolution, a separator ring having openings to space the rollers, the separator ring having a bend in the region of the waist diameter of the rollers to form two side portions at an angle to one another, and the two side portions making substantially the same angle with the axis of the rollers in order to locate the roller engaging edges of each opening along straight line elements in the roller surface.

ATTILIO R. SPICACCI.

REFERENCES CITED

The following references are of record in the file of this patent:

UNITED STATES PATENTS

| Number | Name | Date |
| --- | --- | --- |
| 1,787,214 | Shafer | Dec. 30, 1930 |
| 1,910,184 | Scribner | May 23, 1933 |
| 1,269,808 | Gray | June 18, 1918 |
| 1,880,347 | Herrmann | Oct. 4, 1932 |
| 2,223,799 | Annen | Dec. 3, 1940 |
| 1,376,310 | Armstrong | Apr. 26, 1921 |
| 1,469,991 | Armstrong | Oct. 9, 1923 |
| 1,869,890 | Gibbons | Aug. 2, 1932 |
| 1,736,037 | Else | Nov. 19, 1929 |
| 1,551,334 | Shafer | Aug. 25, 1925 |
| 2,082,390 | Gibbons | June 1, 1937 |
| 2,071,947 | Oelkers et al. | Feb. 23, 1937 |
| 2,227,064 | Bryant | Dec. 31, 1940 |